2 Sheets--Sheet 1.

W. F. COCHRANE.

Machines for Bolting Flour.

No. 6,030. Reissued Aug. 25, 1874.

Attest:
M. Gardner
C. H. Keller.

W. F. Cochrane Inventor:
D. S. Holloway & Co
Attys

W. F. COCHRANE.

Machines for Bolting Flour.

No. 6,030.

Reissued Aug. 25, 1874.

Attest:

M. Gardner

E. H. Keller

W. F. Cochrane Inventor:

D. R. Holloway & Co

Attys

UNITED STATES PATENT OFFICE.

WILLIAM F. COCHRANE, OF LA FAYETTE, IND., ASSIGNOR, BY MESNE ASSIGNMENTS, TO HIMSELF, BENJAMIN H. WARDER, AND RODNEY MASON.

IMPROVEMENT IN MACHINES FOR BOLTING FLOUR.

Specification forming part of Letters Patent No. 37,318, dated January 6, 1863; Reissue No. 6,030, dated August 25, 1874; application filed August 19, 1874.

*To all whom it may concern:*

Be it known that I, WILLIAM F. COCHRANE, of La Fayette, in the county of Tippecanoe and State of Indiana, late of Springfield, in the county of Clarke and State of Ohio, have invented new and useful Improvements in Bolting-Chests for Flouring-Mills; and I do hereby declare that the following is a specification of the same.

Figure 1:
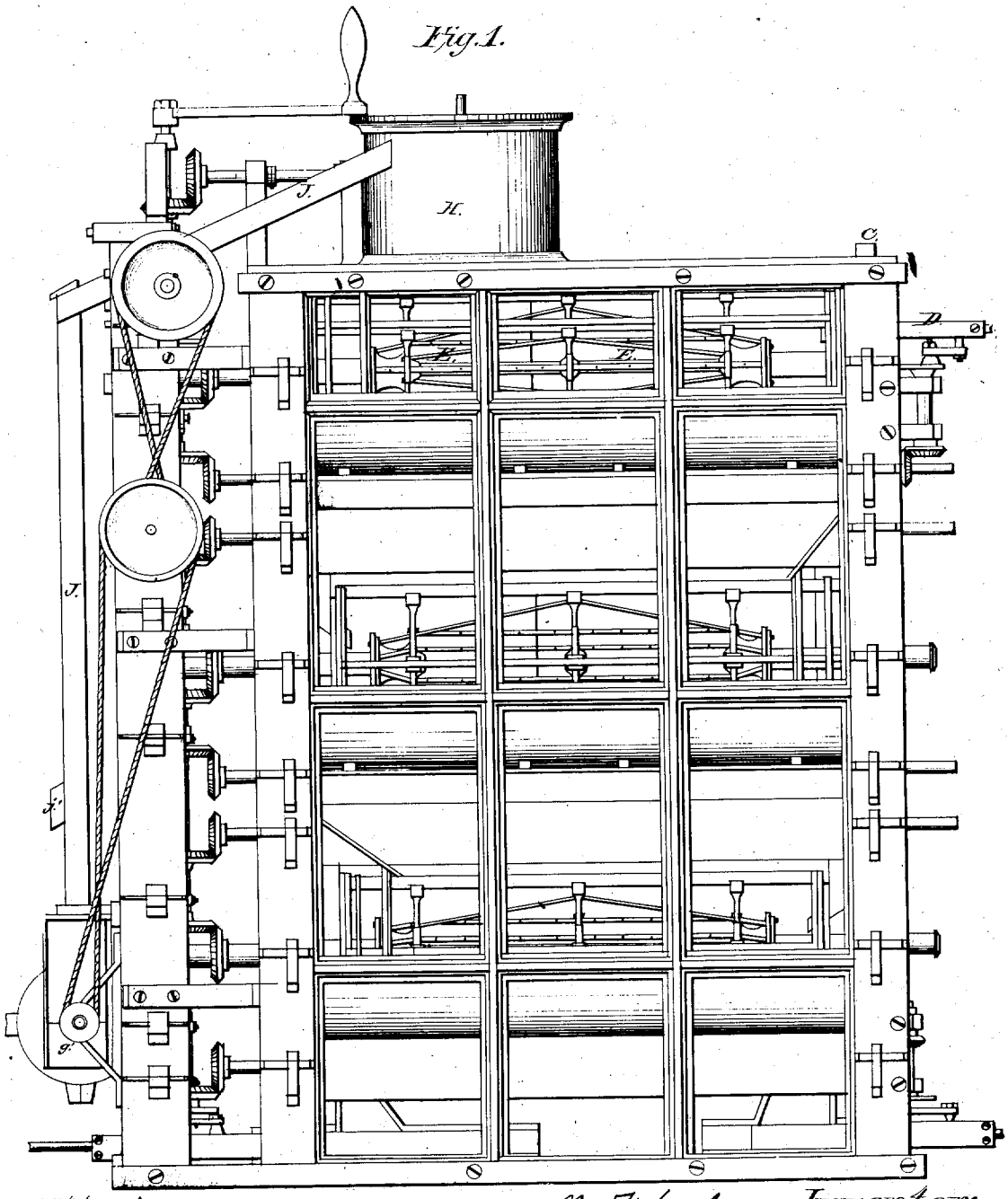
Figure 3:
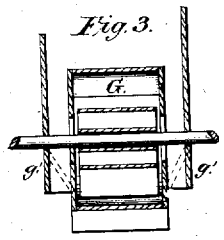
Figure 2:
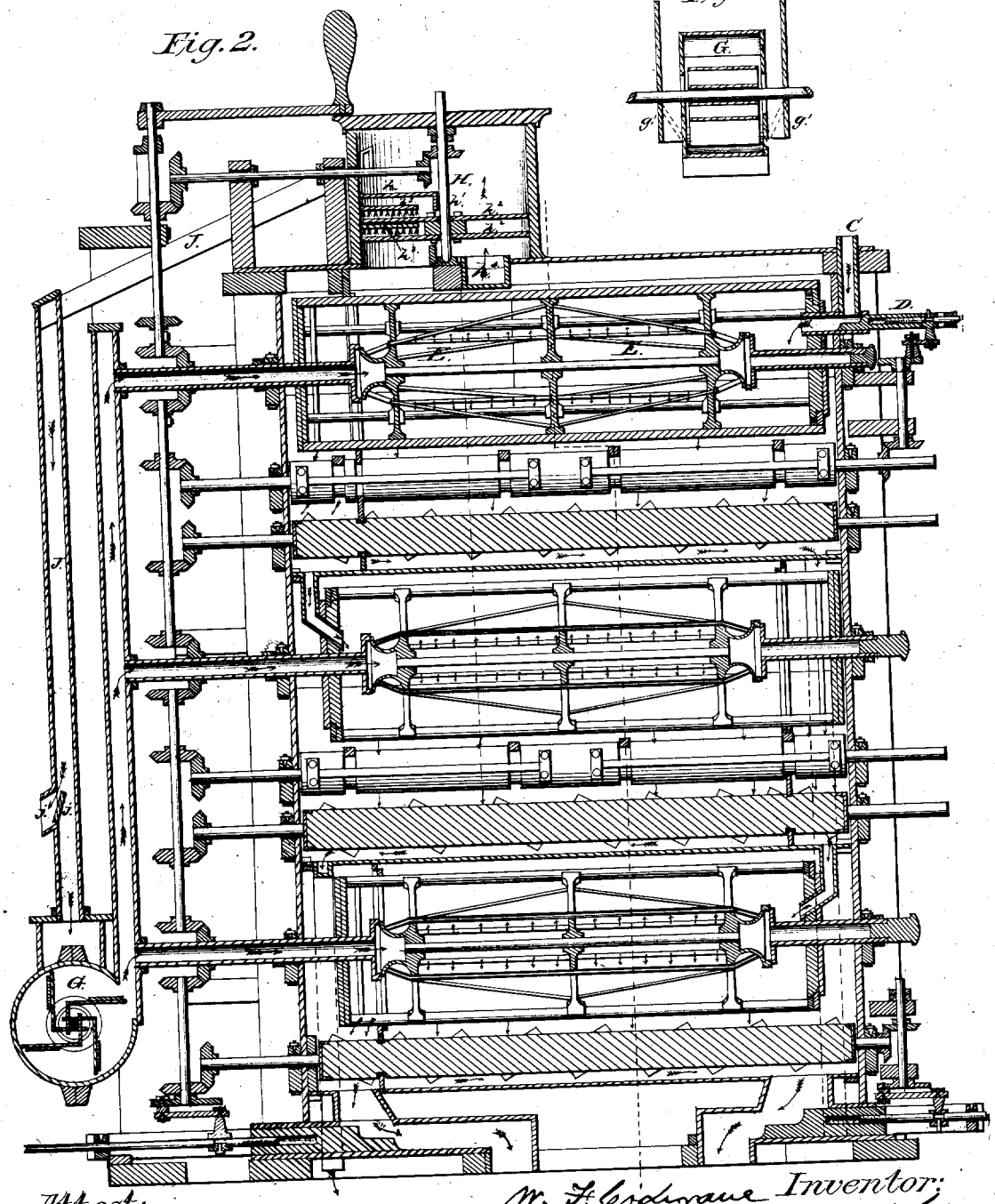

In the annexed drawings, Figure 1 represents a view in elevation of a bolting-chest embracing my improvements, the panels which inclose the chest being removed to show the mechanism; Fig. 2, a vertical longitudinal section through the same, the mechanism being shown partly in elevation and partly in section; and Fig. 3, a vertical transverse section through the fan-case.

The mode of bolting flour ordinarily used in mills as heretofore constructed is attended by various difficulties. The meal, when first ground, is always hot and often damp, the heat being caused by the friction of the stones and the dampness by the moisture absorbed by the grain previous to the grinding. The bolting-cloth generally used is made of threads of silk covered with gum, in order to form a smooth polished surface, so that the flour will pass freely through the fine meshes of the cloth. The dampness and heat of the meal have a tendency to soften and dissolve this gum, and make, instead of a polished surface to the thread, a sticky one, to which the particles of flour adhere, and thus close and clog the meshes of the cloth, and also to cause the thread to swell, consequently decreasing the size of the pores. Without ventilation the air confined in the bolting-chest soon becomes heated and surcharged with moisture, which condenses upon the sides of the chest exposed to the influence of the outer atmosphere, thus causing the flour to "dough" or clog the chest or spouts. It is, moreover, found in practice that flour bolts more regularly and in a better manner when the air inside the chest is kept at a certain uniform temperature, which should be sometimes below and at others above that of the external atmosphere.

My invention has reference to that class of bolting-chests in which atmospheric air is forced through the screen for the purpose of facilitating the work of separation. To this end it is important that the screen should be placed in a tight chest, through which an atmospheric current is forced.

In the case shown in this part of my application, I have shown a fan the pipes of which are so connected with the fan-case that while the blower is forcing in a current of air on one side of the screen the air shall be drawn from the eduction-pipes by suction on the other. By this means I am able to maintain a constant current through the chest, and, by an arrangement of valves in the pipes, to return the whole or a part of the air to the reels, or to allow it all to escape without returning. I also, by the use of the suction, relieve the fan from part of the labor of blowing, and thus am enabled to reduce the force of the blast. The current of air will carry along with it a certain portion of the lighter parts of the meal, which would be wasted when the blast escapes into the open air except for a depositing-chamber placed above the chest, where the particles carried up by the blast are separated from the air. Into this separating-chamber the air is induced by the suction-pipe which opens out of it, and as the current will always follow the line of easiest flow the air will escape through the separating-chamber, instead of seeking an escape through any other openings out of the casing, where it would meet with the resistance of the normal pressure of the atmosphere.

The improvements embraced in this patent consist, first, in the means adopted for maintaining a regulated temperature in the chest by returning to the reels the whole or a portion of the air which has passed through the chest; second, in combining, with the suction-pipe and screen, a valve by means of which the force of the suction may be regulated; third, in combining with the screen and blast and suction pipes a separating-chamber placed in the air-eduction passage, wherein the fine particles of the meal carried up by the blast are separated from the air; fourth, in combining with the screen a perforated blast-pipe and suction-pipe, opening on opposite sides of the screen.

In the accompanying drawings, which represent a convenient arrangement of parts for carrying out the objects of my invention, my improvements are shown as applied to a bolting-chest consisting of three reels, arranged one above the other.

It is deemed unnecessary here to describe in detail the construction and arrangement of the various parts of the mechanism further than may be necessary to explain the construction of such parts as are intended to be covered by this patent, as other parts are fully described in, and covered by, several other patents bearing even date herewith founded upon sundry applications cotemporaneously filed by me.

The collection-chamber is shown in this instance as being cylindrical in form and closed at top, but open at bottom. A portion of its area is also covered by a partition, *h*. Two parallel horizontal screens are secured upon a vertical rotating shaft, $h^1$, driven by suitable gearing. A series of brushes, $h^3$, is secured upon the inner side of the periphery of the cylinder, and project horizontally therefrom in contact with the revolving screens $h^2$.

The chamber H communicates directly with the upper reel E, through its open bottom, while the blast-air escapes from the other reels into the chamber through suitable pipes $h^4$.

A suction-pipe, J, leads from the chamber above the screen to the fan G. This pipe is provided with a cast-off valve, *j*, so arranged that in one extreme position all the air is forced to return to the fan, while in the other extreme position the ingress to the fan is entirely cut off, and, when fixed in an intermediate position, a portion of the air may be drawn from the chest, and a portion discharged through the opening *j'* in the suction-pipe, at the will of the operator.

The fresh air enters the fan through an opening on each side of the fan-case. The size of these openings is regulated by valves *g'*, Fig. 3. The functions of these valves are very important, as they serve not only to regulate the quantity of fresh air admitted to the reels, but also the force of the blast.

The operation of the machine is as follows: The meal passes through the spout C into the pump D, by which it is injected into the reel E without allowing the air to pass at the same time. The bolting is assisted by a strong blast from the fan entering the reel through the hollow shaft into a bell-mouthed collar, and thence passing into perforated pipes extending out into the space between the shaft and bolting-surface, delivering the air in jets. After passing through the screens, the air enters the collecting-chamber H, carrying a portion of fine flour with it in the form of dust. The air escapes through the screens $h^2$ (leaving the fine flour upon them to be returned to the bolting-chamber) into the suction trunk or pipe J, and may be either returned to the fan and through the reels, by closing the opening *j'* by means of the valve *j*, or be allowed to escape directly into the open air by opening that valve, so as to close the suction-pipe. This capability of returning or not returning the air to the reels again is one of great importance, for under certain conditions of atmosphere, such as warm damp weather, if the air be returned to the bolts it will cause the reels to dough, and sometimes even clog the conveyer, as I have found by experience. The air during its passage through the chest takes up the heat from the meal which it has acquired by being ground, so that warm air may be returned to the fan when the external air is too cold. The quantity of external air admitted to the bolt is regulated by opening or closing the valves *g'*, one of which is on each side of the fan, by which means it will be seen that I have the blast perfectly under control. By admitting the air through the perforated pipes on one side of the screen, and placing the suction-pipe on the other, I am enabled to reduce the force required to be given to the blast.

I have described my improvements as applied to a chest consisting of three reels, arranged one above the other; but it is obvious that a greater or less number might be employed, and that the details of my arrangements might be varied to some extent, without departing from the spirit of my invention. Such modification would readily occur to a skillful millwright after reading my specification.

What I claim as my invention, and desire to secure by Letters Patent, is—

1. In combination with a flour-bolting chest, a fan and connected air induction and exhaust pipes for maintaining a continuous circulation of air through the chest, substantially as set forth.

2. A cast-off valve in the return air-trunk of an atmospheric bolt, for regulating the quantity of warm air returned to the fan, substantially as set forth.

3. In combination with the screen incased in a chest, and blast-induction and suction-eduction pipes, the dust-collecting chamber, substantially as set forth.

4. In combination with the screen incased in a chest, the perforated blast-pipe and the suction-pipe, arranged to operate on opposite sides of the screen, substantially as set forth.

In testimony that I claim the foregoing I have hereunto set my hand this 18th day of August, 1874.

WM. F. COCHRANE.

Witnesses:
R. MASON,
THOMAS C. CONNOLLY.